(12) United States Patent
Li

(10) Patent No.: US 10,135,336 B2
(45) Date of Patent: *Nov. 20, 2018

(54) CONTROL ARCHITECTURE WITH IMPROVED TRANSIENT RESPONSE

(71) Applicant: LINEAR TECHNOLOGY CORPORATION, Milpitas, CA (US)

(72) Inventor: Jian Li, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,200

(22) Filed: Mar. 20, 2017

(65) Prior Publication Data

US 2017/0194863 A1 Jul. 6, 2017

Related U.S. Application Data

(63) Continuation of application No. 15/048,511, filed on Feb. 19, 2016, now Pat. No. 9,627,976.

(60) Provisional application No. 62/126,421, filed on Feb. 27, 2015, provisional application No. 62/126,418, filed on Feb. 27, 2015, provisional application No. 62/119,078, filed on Feb. 20, 2015, provisional application No. 62/119,042, filed on Feb. 20, 2015.

(51) Int. Cl.
*H02M 3/158* (2006.01)
*H02M 1/08* (2006.01)
*H02M 1/00* (2006.01)
*H02M 3/156* (2006.01)

(52) U.S. Cl.
CPC ............. *H02M 3/158* (2013.01); *H02M 1/08* (2013.01); *H02M 3/1584* (2013.01); *H02M 2001/0009* (2013.01); *H02M 2003/1566* (2013.01)

(58) Field of Classification Search
CPC ............... H02M 3/158; H02M 3/1584; H02M 2001/0009; H02M 2003/1566; H02M 1/08
See application file for complete search history.

(56) References Cited

U.S. PATENT DOCUMENTS 5,929,692 A 7/1999 Carsten
6,683,441 B2 1/2004 Schiff et al.
(Continued)

OTHER PUBLICATIONS

Notice of Allowance U.S. Appl. No. 15/048,511 dated Jan. 9, 2017.
(Continued)

*Primary Examiner* — Jue Zhang
(74) *Attorney, Agent, or Firm* — Schwegman Lundberg & Woessner, P.A.

(57) ABSTRACT

A power supply system includes a power source; a load device configured to receive power from the power source; and a power interface device coupled to the power source and the load device and configured to change a first voltage provided by the power source to a second voltage for operating the load device. The power interface device include a main switching converter configured to operate at a first switching frequency and source low frequency current to the load device and an auxiliary switching converter coupled in parallel with the main switching converter and configured to operate at a second and different switching frequency and source fast transient high frequency current to the load device.

22 Claims, 6 Drawing Sheets

(56) References Cited

U.S. PATENT DOCUMENTS

| | | | |
|---|---|---|---|
| 6,984,969 B1 * | 1/2006 | Liu | H02M 3/158 |
| | | | 323/280 |
| 7,233,130 B1 * | 6/2007 | Kay | H02M 1/143 |
| | | | 323/222 |
| 7,609,040 B1 | 10/2009 | Jain | |
| 8,441,242 B2 | 5/2013 | Ng et al. | |
| 8,917,077 B2 * | 12/2014 | Lin | G05F 1/10 |
| | | | 323/271 |
| 8,957,514 B1 * | 2/2015 | Barnette | H02M 3/00 |
| | | | 257/691 |
| 9,256,238 B1 * | 2/2016 | Kotikalapoodi | G05F 1/59 |
| 9,520,788 B2 | 12/2016 | Kobayashi | |
| 9,627,976 B2 * | 4/2017 | Li | H02M 3/1584 |
| 2002/0036486 A1 * | 3/2002 | Zhou | G05F 1/62 |
| | | | 323/272 |
| 2009/0044031 A1 | 2/2009 | Vinayak et al. | |
| 2009/0201000 A1 | 8/2009 | Kojima et al. | |
| 2010/0033153 A1 | 2/2010 | Xing et al. | |
| 2011/0241636 A1 | 10/2011 | Wu et al. | |
| 2014/0184177 A1 | 7/2014 | Tournatory et al. | |
| 2014/0218109 A1 | 8/2014 | Wimpenny | |
| 2016/0211750 A1 | 7/2016 | Coleman et al. | |
| 2016/0248327 A1 | 8/2016 | Li | |
| 2016/0248328 A1 | 8/2016 | Zhang et al. | |

OTHER PUBLICATIONS

A. Barrado et al., "The Fast Response Double Buck DC-DC Converter (FRDB): Operation and Output Filter Influence", IEEE Transactions on Power Electronics, vol. 20, No. 6, Nov. 2005.

* cited by examiner

CONTROL ARCHITECTURE WITH IMPROVED TRANSIENT RESPONSE

CROSS REFERENCE TO RELATED APPLICATIONS

This application is a Continuation Application of U.S. Ser. No. 15/048,511, filed Feb. 19, 2016, and entitled "CONTROL ARCHITECTURE WITH IMPROVED TRANSIENT RESPONSE", which claims the benefit of priority from pending U.S. Provisional Application Ser. No. 62/119,042, filed Feb. 20, 2015, and entitled "FAST TRANSIENT POWER SUPPLY WITH A FIRST CONTROL SIGNAL FOR A HIGHER FREQUENCY CURRENT AND A SECOND CONTROL SIGNAL FOR A LOWER FREQUENCY CURRENT," U.S. Provisional Application Ser. No. 62/126,418, filed Feb. 27, 2015, and entitled "FAST TRANSIENT POWER SUPPLY WITH A FIRST CONTROL SIGNAL FOR A HIGHER FREQUENCY CURRENT AND A SECOND CONTROL SIGNAL FOR A LOWER FREQUENCY CURRENT," U.S. Provisional Application Ser. No. 62/119,078, filed Feb. 20, 2015, and entitled "CONTROL ARCHITECTURE WITH IMPROVED TRANSIENT RESPONSE," and U.S. Provisional Application Ser. No. 62/126,421, filed Feb. 27, 2015, and entitled "CONTROL ARCHITECTURE WITH IMPROVED TRANSIENT RESPONSE," which are each incorporated by reference herein in their entirety.

BACKGROUND

A power supply system includes a power source, a load device, and a power interface device coupled to the electrical power source and the load device. The power source may include a battery, a power grid, a solar photovoltaic cell, an AC generator, and/or an output of front-end power converter. The power interface device may be configured to increase or decrease the voltage of the power source to provide a suitable voltage for the load device. The power interface device may be a boost converter or a buck converter or any other converter. The load device may include a resistive load, a magnetic load, a capacitive load, a heater. In one implementation, the load device may be a low voltage but a high current load device such as, for example, computer central processing unit (CPU). This type of load device may have many load transient conditions.

During a load transient condition, the current of the load device may substantially change within a very short time period. For example, during the transient condition, the current of the load device may increase from 0 A to 100 A, or decrease from 100 A to 0 A, in less than one microsecond. These sudden changes in current can create large voltage variation at the load device and can cause the output voltage to swing outside of the regulated operating window of the load device.

To minimize transient variations, in one implementation, a large power capacitor may be added to the output of the power supply system. The capacitor may source or sink the necessary current during the transient condition and therefore reduce voltage variation caused by the load transient. To this end, the output capacitor is useful in supplementing the inductor's slowly rising current to meet the increase in current demand from the load device. Similarly, the output capacitor is useful in sinking the current to meet the sudden decrease in current from the load device. Capacitors, however, are expensive and as such may increase cost or size of the system.

In another implementation, the converter may be pushed to run at higher bandwidth to respond to a load transient quickly. However, a switching mode converter bandwidth is limited by its switching frequency. Therefore, to push the converter to run at the higher bandwidth, the converter has to operate at higher switching frequency. This means more power loss because each time there is a turn on/off of the switch, there is a power loss. As such, the power supply system is also limited by the power loss of the power converter placed between the power source and the load device.

Hence, a need exists for a power supply system capable of providing a fast response to the transient condition of the load device while increasing the efficiency and reducing costs and size.

SUMMARY

In one general aspect, the instant application describes a power interface device that includes a main switching converter configured to receive a first voltage at an input terminal and to output a second and different voltage at an output terminal. The main switching converter includes a first main switch, a second main switch, and a main inductor. The first main switch at one end is coupled to the input terminal and at another end is coupled to a main node. The second main switch at one end is coupled to the main node and at another end is coupled to a ground terminal. The main inductor at one end is coupled to the main node and at another end is coupled to the output terminal. The power interface device also includes an auxiliary switching converter coupled in parallel with the main switching converter and configured to receive the first voltage at the input terminal and to output the second voltage at the output terminal. The auxiliary switching converter includes a first auxiliary switch, a second auxiliary switch, and an auxiliary inductor. The first auxiliary switch at one end is coupled to the input terminal and at another end is coupled to an auxiliary node. The second auxiliary switch at one end is coupled to the auxiliary node and at another end is coupled to a ground terminal. The auxiliary inductor at one end is coupled to the auxiliary node and at another end is coupled to the output terminal.

The power interface device further includes an auxiliary control loop circuit at one end coupled to the output terminal and at another end coupled to the auxiliary switching converter. The auxiliary control loop circuit is configured to detect a transient at the output terminal and responsive to the transient issue an auxiliary control signal for driving the auxiliary switching converter to output fast transient high frequency current to the output terminal. The auxiliary control loop circuit is configured to prevent a lower frequency component of a transient signal associated with the transient from entering the auxiliary switching converter by using a resistor and an adder circuit. The resistor is coupled at one end to the auxiliary inductor and at another end to the adder circuit coupled to the output terminal. The auxiliary switching converter is configured to operate at an auxiliary switching frequency different from a main switching frequency of the main switching converter.

The above general aspect may include one or more of the following features. The main switching converter may include a plurality of single phase switching regulators coupled in parallel with each other between the input terminal and the output terminal. Each of the single phase switching regulators may be configured to operate at the main switching frequency, which is lower than the auxiliary switching frequency to provide a stable output at the output terminal.

The power interface device may further include a main control loop circuit at one end coupled to the output terminal and at another end coupled to the main switching converter. The main control loop circuit may be configured to detect the transient at the output terminal and responsive to the transient issue a main control signal for driving the main switching converter. The main control loop circuit may include a main feedback sense circuit configured to sense an output voltage at the output terminal and produce a feedback voltage, a main error operational amplifier configured to receive the feedback voltage and a reference voltage and generate the transient signal when the feedback voltage and the reference voltage are not substantially equal to each other, and a main pulse-width modulator configured to receive the transient signal and sensed low frequency inductor current from the main switching converter and issue the main control signal based on a difference between the transient signal and the sensed low frequency inductor current.

The main control signal may be a pulse-with-modulation signal for enabling the main switching converter to source the low frequency current to track the transient signal and drive an output current to meet an increased load current at a load device. The main feedback sense circuit may include a plurality of resistors and capacitors configured to sense the output voltage and produce the feedback voltage. The main error operational amplifier may be configured to receive the feedback voltage at its inverting terminal and to receive the reference voltage at its non-inverting terminal.

The auxiliary control loop circuit may further include a first auxiliary error amplifier configured to receive an output of the adder circuit and a reference voltage and output an error signal when the output of the adder circuit and the reference voltage are not substantially equal to each other. The auxiliary control loop circuit may further include an auxiliary pulse-width modulator configured to receive the first error signal and sensed high frequency inductor current from the auxiliary switching converter and issue the auxiliary control signal based on a difference between the first error signal and the sensed high frequency inductor current. The first error signal may correspond to the higher frequency component of the transient signal. The resistor may enable the auxiliary control loop circuit to absorb only the higher frequency component of the transient signal and not the lower frequency component of the transient signal. The higher frequency component of the transient signal may be only present when there is a sudden increase or decrease in a load current.

In response to the auxiliary control signal, the auxiliary switching converter may be configured to source the fast transient high frequency current to the output terminal. The fast transient high frequency current may be configured to track the higher frequency component of the transient signal. The auxiliary control loop circuit may further include a second auxiliary error amplifier configured to receive the sensed average auxiliary inductor current and a zero average low frequency current and output a second error signal. The first auxiliary error amplifier is configured to output the higher frequency component of the transient signal based on the output of the adder circuit, the reference voltage, and the second error signal.

In another general aspect, the instant application describes a power supply system that includes a power source; a load device configured to receive power from the power source; and a power interface device coupled to the power source and the load device and configured to change a first voltage provided by the power source to a second voltage for operating the load device. The power interface device includes a main switching converter configured to operate at a first switching frequency and source low frequency current to the load device and an auxiliary switching converter coupled in parallel with the main switching converter and configured to operate at a second and different switching frequency and source fast transient high frequency current to the load device. The power supply system further includes an auxiliary control loop circuit coupled at one end to the auxiliary switching converter and at another end to the load device and configured to absorb a higher frequency component of a transient signal using a resistor and an adder circuit and operate the auxiliary switching converter based on the higher frequency component of the transient signal.

The above general aspect may include one or more of the following features. The auxiliary switching converter may include a first auxiliary switch, a second auxiliary switch, and an auxiliary inductor. The first auxiliary switch at one end may be coupled to the power source and at another end may be coupled to an auxiliary node. The second auxiliary switch at one end may be coupled to the auxiliary node and another end may be coupled to a ground terminal. The auxiliary inductor at one end may be coupled to the auxiliary node and at another end may be coupled to the load device.

The auxiliary control loop circuit may further include an auxiliary error operational amplifier and an auxiliary pulse-width modulator. The resistor may be coupled at one end to the auxiliary inductor and at another end to the adder circuit. The adder circuit may be configured to add an output voltage to a voltage detected across the resistor and output a feedback voltage. The auxiliary error amplifier may be configured to receive the feedback voltage and a reference voltage and output the higher frequency component of the transient signal when the feedback voltage and the reference voltage are not substantially equal to each other. The auxiliary pulse-width modulator may be configured to receive the higher frequency component of the transient signal and the sensed high frequency inductor current from the auxiliary switching converter and issue an auxiliary control signal based on a difference between the higher frequency component of the transient signal and the sensed high frequency inductor current.

The higher frequency component may be only present when there is a sudden increase or decrease in the load current. In response to the auxiliary control signal, the auxiliary switching converter may be configured to source the fast transient high frequency current to the load device only during the transient. The fast transient high frequency current may be configured to track the higher frequency component of the transient signal.

The auxiliary control loop circuit may further include a second auxiliary amplifier configured to receive the sensed average high frequency inductor current and a zero average current and output an error signal. The auxiliary error amplifier may be configured to output the higher frequency component of the transient signal based on the reference voltage, the feedback voltage, and the error signal from the second auxiliary amplifier.

The main switching converter may include a plurality of switching regulators each including a first main switch, a second main switch, and a main inductor. The first main switch at one end may be coupled to the power source and at another end may be coupled to a main node. The second main switch at one end may be coupled to the main node and another end may be coupled to a ground terminal. The main inductor at one end may be connected to the main node and at another end may be coupled to the load device.

The power supply system may further include a main control loop circuit at one end coupled to the load device and at another end coupled to the main switching converter. The main control loop circuit may be configured to detect the transient at the load device and responsive to the transient issue a main control signal for driving the main switching converter at the first switching frequency.

The plurality of switching regulators in the main switching converter may include three or more single phase switching regulators coupled in parallel with each other between the power source and the load device. Each of the single phase switching regulators may be configured to operate at the first switching frequency which is lower than the second switching frequency to provide a stable output at an output terminal of the power interface device.

The main control loop circuit may include a main feedback sense circuit configured to sense an output voltage at the output terminal and produce a feedback voltage, a main error operational amplifier configured to receive the feedback voltage and a reference voltage and generate a transient signal when the feedback voltage and the reference voltage are not substantially equal to each other, and a main pulse-width modulator is configured to receive the transient signal and sensed low frequency inductor current from each of the single phase switching regulators and issue the main control signal based on a difference between the transient signal and the sensed low frequency inductor current. The main control signal may be a pulse-with-modulation signal for enabling each of the single phase switching regulators to source the low frequency current to track the transient signal and drive an output current to meet an increased load current at the load device.

BRIEF DESCRIPTION OF DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuit have been described at a relatively high-level, without detail, in order to avoid unnecessarily obscuring aspects of the present teachings.

Figure 1:
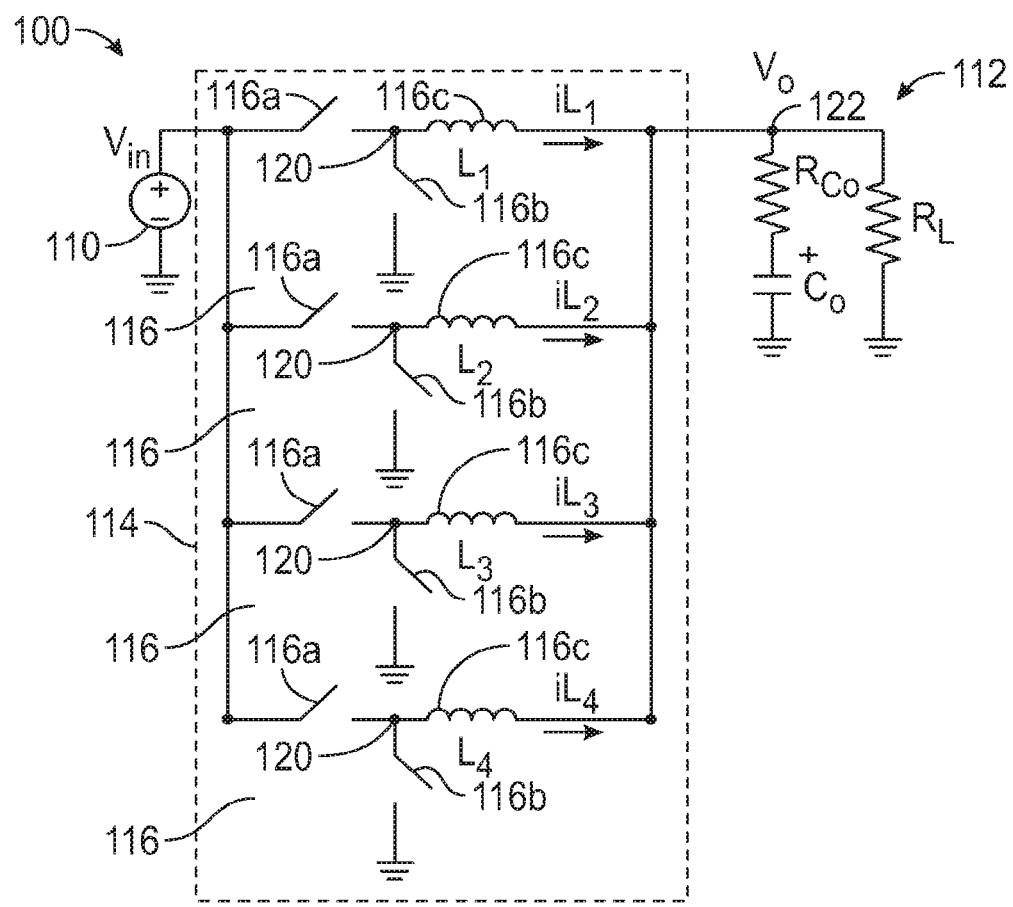
FIG. 1 illustrates an exemplary power supply system with a slow transient response.

FIG. 1 illustrates an exemplary power supply system 100 with a slow transient response. The power supply system 100 includes a power source 110, a load device 112, and a power interface device 114 between the power source 100 and the load device 112. The power source 110 is configured to output a certain standard voltage. To this end, the power source 110 may be an electrical outlet. Most single phase alternating-current electrical outlets in the world supply power at 210-240 V or at 100-120 V. Alternatively, the power source 110 may include other types of power sources such as, for example, one or more of a battery, a solar photovoltaic, or an AC generator. Regardless of the type of the power source 110, the power source 110 often provides a voltage different from the required voltage for the load device 112. The provided voltage may be higher or lower than the required voltage for the load device 112. To match the source voltage to the load voltage, the power supply system 100 includes the power interface 114. The power interface 114 is configured to make the voltage of the power source 110 compatible with the voltage of the load device 112.

The power interface device 114 is configured to change the voltage of the electrical power source 110 to an appropriate voltage for the load device 112. As noted above, the appropriate voltage for the load device 112 may be higher or lower than the voltage of the electrical power source 110. In one implementation, the appropriate voltage for the load device 112 is lower than the voltage of the electrical power source 110. In one specific example, the power interface device 114 is configured to reduce the voltage of the electrical power source 110 from 12 volts to 0.85 volt for the load device 112. The output current from the power interface device 114 may be 100 A.

The load device 112 may include a resistive load, a magnetic load, a capacitive load, a heater, or other electric or electronic devices. Most electronic devices require between 1.5 and 24 volts DC. These devices can work either from batteries or mains. In either case, the power interface device 114 may be used to match the voltage requirements of these electronic devices with the voltage provided from the power source 110. The power interface device 114 may be internal to the load device 112 or may be external to the load device 112. Similarly, the power interface device 114 may be internal to the power source 110 or may be external to the power source 110. In another implementation, the power interface device 114 may be a stand-alone integrated circuit.

The power interface device 114 may include a transformer, a rectifier, or switched-mode power supplies. The switched-mode power supplies have become widespread and are smaller and lighter than the once-universal transformer converters, and are often designed to work from AC mains at any voltage between 100 and 250 V. Additionally, because switched-mode power supplies are typically rectified to operate at a DC voltage, they are minimally affected by the frequency of the mains (50 vs 60 Hz). The foregoing description assumes that power interface device 114 includes switched-mode power supplies; however, as noted above, the power interface device 114 may include circuits other than switched-mode power supplies.

As shown, the power interface device 114 includes four single phase switching regulators 116 connecting the power source 110 to the load device 112. Although the specific example shows four single phase switching regulators, the power interface device 114 may include greater or fewer than four single phase switching regulators 116. The power interface device 114 may be configured to operate in at least two modes of operation: a normal mode at high to moderate load currents and a low power mode at low load currents. In normal mode, all four switching regulator circuits 116 may be ON, sourcing current to the load device 112 through their respective inductors and each phase may source similar low frequency current to the load device 112. In the low power mode, three of the switching regulator circuits 116 may be OFF and one switching regulator circuit 116 may be ON, sourcing 100% of the output current of the power interface device 114. The low power mode can improve the efficiency of the power interface device 114 at light load currents. This is because fewer switching regulator circuits 116 are ON in the low power mode than that of the normal mode and therefore there is less switching loss in the lower power mode.

The single phase switching regulators 116 may be current-mode switching regulators that include an inductor. The single phase switching regulators 116 may be synchronous switching regulators but they also may be non-synchronous switching regulators. In one specific example, the single phase switching regulators 116 may be a step-down, current mode, switching regulator in which the input voltage Vin is greater than the output voltage Vout. To this end, each single phase switching regulator 116 may include a first switch 116a, a second switch 116b, and an inductor 116c. The first switch 116a and the second switch 116b may be MOSFET switches. The MOSFET switches may be n-channel MOSFET or p-channel MOSFET switches.

In each of the single phase switching regulators 116, the first switch 116a may be connected at one end to the Vin and at another end to a first node 120; the second switch 116b may be connected at one end to the first node 120 and at the other end to the ground terminal; and the inductor 116c may be connected at one end to the first node 120 and at the other end to the output terminal 122. The output terminal 122 may be connected to the load device 112 including resistor Rco and capacitor Co and the load resistance RL.

The power interface device 114 is configured to supply output current to the load device 112 a regulated voltage Vout. To this end, the first switch 116a and the second switch 116b in each of the single phase switching regulator 116 are switched ON and OFF by a driver circuit. The switches 116a and 116b may be driven out of phase with respect to each other to supply current to a load coupled to output terminal 122. Although not shown, additional circuitry may be added to the power interface 114 to provide a brief dead-time or blanking interval between the moment that one switching transistor turns OFF and the moment that the other switching transistor turns ON. When the switch 116a is ON and the switch 116b is OFF, current flows from the Vin to the output terminal 122 through the inductor 116c in each of the single phase switching regulators 116. In this scenario, the rate of change of inductor current 116c over time may be equal to ((Vin−Vout)/L). When the switch 116a is OFF and the switch 116b is ON, current flows from the ground to the output terminal 122 though the inductor 116c. In this scenario, the rate of change of inductor current 116c over time may be equal to (−Vout/L).

In one specific example, the power supply system 100 may be configured to meet the following criteria:
Vin=12V
Vout=0.85V, Iout_max=100 A
ΔVout=3% Vout at 25% load step
Fsw=500 kHz
L=220 nH (per phase)
Co=12*220 uF (in total)

Although not shown, the driver circuit may be controlled by a feedback control mechanism configured to set a peak inductor current threshold. To this end, when the inductor current exceeds the current threshold, the feedback control mechanism is configured to send a signal to the driver circuit to turn OFF the first switch 116a and to turn ON the second switch 116b. Current then flows from the ground through the switch 116b and inductor 116c to the output terminal 122. As a result, the current ramps down in the inductor 116c to the current threshold.

To provide a faster transient response, the power supply system 100 may have to either run its switching regulators 116 at a higher frequency, which results in reduction in efficiency or include a large output power capacitor, which results in added complexity, cost, and size of the overall system. It may be desirable for the power supply circuit to be as light and as compact as possible while also providing electricity for as long as possible and as efficiently as possible.

The load device may have different power requirements. This naturally means the power supply system may have to run as efficient as possible both to reduce size and to reduce input power to save energy and increase efficiency. Thus, instead of running the regulators 116 all at the higher frequency to provide a fast response to the transient conditions or alternatively adding a power capacitor to the output, in one implementation, a power supply system may be implemented in which only one of the regulators 116 runs at a higher frequency in response to the higher frequency component of the transient current and the remaining regulators 116 run a lower frequency.

To this end, the power supply system may include a main switching converter and an auxiliary switching converter running in parallel with each other. The main switching converter may run at normal switching frequency and therefore with high efficiency but not with high transient performance. The auxiliary switching converter may run at a much faster switching frequency than that of the main switching converter. Therefore, the auxiliary switching converter may have a higher switching loss than that of the main switching converter but with a better transient performance. Hence, the auxiliary switching converter may not be utilized to provide the main low frequency power to the load device. Instead, the auxiliary switching converter may only be used to deal with transient conditions to sink or source additional current with sudden increase or decrease in load current.

Figure 2:
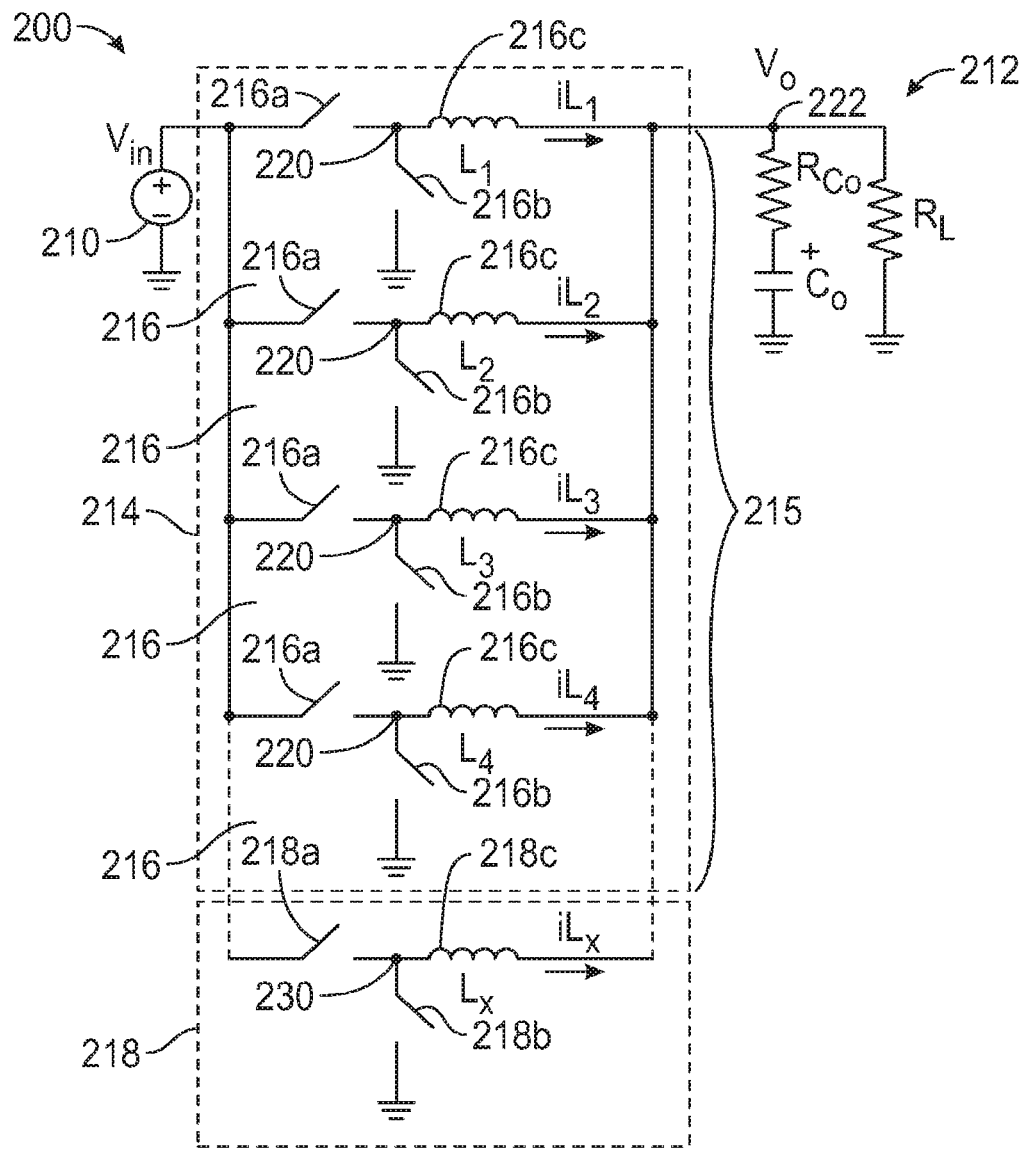
FIG. 2 illustrates an exemplary power supply system with a fast transient response including a main switching converter and an auxiliary switching converter.

FIG. 2 illustrates an exemplary power supply system 200 with a fast transient response including a main switching converter and an auxiliary switching converter. The power supply system 200 includes a power source 210, a load device 212, and a power interface device 214 coupled to the power source 210 and load device 212. The power source 210 and the load device 212 are similar to the power source 110 and the load device 112, and hence for brevity are not described further.

The power interface device 214 includes a main switching converter 216 and an auxiliary switching converter 218. The main switching converter 215 includes four single phase switching regulators 216. The four signal phase switching regulators 216 are similar to the four single phase switching regulators 116. The four single phase switching regulators 216 are connected in parallel with each other.

Each of the single phase switching regulators 216 may include a first switch 216a, a second switch 216b, and an inductor 216c. The first switch 216a and the second switch 216b may be MOSFET switches. The MOSFET switches may be n-channel MOSFET or p-channel MOSFET switches. The first switch 216a may be connected at one end to the Vin and at another end to a first node 220; the second switch 216b may be connected at one end to the first node 220 and at the other end to the ground terminal; and the inductor 216c may be connected at one end to the first node 220 and at the other end to the output terminal 222. The output terminal 222 may be connected to the output capacitor $C_o$ and the load resistance $R_L$.

The auxiliary switching converter 218 is connected in parallel with the main switching converter 216. The auxiliary switching converter 218 may include a first switch 218a, a second switch 218b, and an inductor 218c. The first switch 218a and the second switch 218b may be MOSFET switches. The MOSFET switches may be n-channel MOSFET or p-channel MOSFET switches. The first switch 218a may be connected at one end to Vin and at another end to a first node 230; the second switch 218b may be connected at one end to the first node 230 and at the other end to the ground terminal; and the inductor 218c may be connected at one end to the first node 230 and at the other end to the output terminal 222.

The power interface device 214 is configured to supply output current to a load coupled to the output terminal 222 at a regulated voltage Vout. To this end, each of the first switch 216a and the second switch 216b in the single phase switching regulator 216 are switched ON and OFF by a first driver circuit. The switches 216a and 216b may be driven out of phase with respect to each other to supply current to a load coupled to output terminal 222. Similarly, the first switch 218a and the second switch 218b in the single phase switching regulator 218 are switched ON and OFF by a second driver circuit. The switches 218a and 218b may be driven out of phase with respect to each other to supply current to a load coupled to output terminal 222. The switches 216a and 216b may be configured to run at a first switching frequency. The switches 218a and 218b may be configured to run at a second switching frequency.

The second switching frequency may be a faster switching frequency (fsw) than that of the first switching frequency. To this end, the auxiliary switching converter 218 has a higher bandwidth than that of the main switching converter 215 and faster transient response to the transients at the load device 212 than that of the main switching converter 215. Since the auxiliary switching converter 218 has a higher or faster switching frequency than that of the main switching converter 215, it naturally has a greater power loss. As such, the auxiliary switching converter 218 may be configured to run source or sink current to the output only during the transient conditions and be responsive to the higher frequency component of the transients. The first and second switching frequencies may correspond to a predetermined fixed frequency.

In order to increase efficiency, the power interface device 214 may be configured to control the auxiliary switching converter 218 to source higher frequency current during the transient and not source current at other times. In contrast, the power interface device 214 may be configured to control the main switching converter 216 to source lower frequency current during transient and during the steady-state operation. In order to enable such a control, the power supply interface device 214 may include two separate control feedback mechanisms. The first control feedback mechanism is configured to control the main switching converter 216 based on the sensed output voltage or current output. The second control feedback mechanism is configured to control the auxiliary switching converter 218 based on the sensed output voltage or current output. To enable the auxiliary switching converter 218 to source or sink a higher frequency current only during the transients, the second control mechanism may be configured to detect the transient, generate corresponding transient signal, separate a higher frequency component of the transient signal from its lower frequency component and run the auxiliary switching converter 218 only in response to the higher frequency component of the transient signal. Since the higher frequency component of the transient signal is only present during the transients, the auxiliary switching converter 218 may only source or sink higher frequency current during the transients and not during the steady-state operation. During the steady-state operation, the higher frequency current may not exist and the average lower frequency (or DC) current may be zero.

The transient may include a scenario in which there is a sudden increase or decrease in the load current or voltage. To illustrate one example, during a 25A current load step at the output, the transient may correspond to the beginning of the load step, where there is a sudden increase in the load current before reaching a first steady-state level at the increased level of 25 A. Similarly, the transient may correspond to the ending of the load step where there is a sudden decrease in the load current before reaching a second steady-state level. The second steady-state may correspond to a state prior to the 25A current load step or to a new state higher or lower than the state prior to the 25A current load step.

In one implementation, to separate the higher frequency component and lower frequency component of the transient signal from each other, a filtering network may be used. This implementation has been described in the corresponding application, titled "FAST TRANSIENT POWER SUPPLY WITH A SEPARATED HIGH FREQUENCY AND LOW FREQUENCY PATH SIGNALS," filed concurrently herewith, the content of which is incorporated by reference. In another implementation, to separate the higher frequency component and the lower frequency component of the transient signal from each other, a droop control mechanism may be used.

In the droop control mechanism, similar to the filtering network, the control feedback loop for the auxiliary switching converter may be separate from the control feedback loop for the main switching converter. The control feedback loop for the auxiliary switching converter may include Vout active droop resistance (active voltage positioning—AVP) to prevent the lower frequency component of the transient signal from entering the auxiliary switching converter from the output. This may enable the auxiliary switching converter to only source or sink higher frequency current during the transient and not during the steady state operation. This can result in the main switching converter providing high efficiency power in steady state while the auxiliary switching converter provides a high transient response. In one implementation, the higher frequency component of the transient signal may also be prevent from entering the main switching converter from the output. In another implementation, the main switching converter may receive both the higher frequency component and the lower frequency component of the transient signal.

The AVP may refer to setting the power supply output voltage at a point that is dependent on the load current. At minimum load, the output voltage may be set to a slightly higher than nominal level. At full load, the output voltage may be set to slightly lower than nominal level. Effectively, the DC load regulation may be degraded, but the load transient voltage deviation and transient response may be significantly improved. In order to implement AVP, a method for sensing the load current or the inductor current may be required. This may then be converted to a voltage and used to move the output voltage in a correct direction. The simplest way to cause the output voltage to drop with the load current is to add some resistance to the output. To this end, the AVP circuitry includes a resistor. The resistor is configured to drop the Vout by the resistance of the resistor times the load current. This results in quickly returning current of the inductor to zero shortly after the initiation of the transient.

Figure 3:
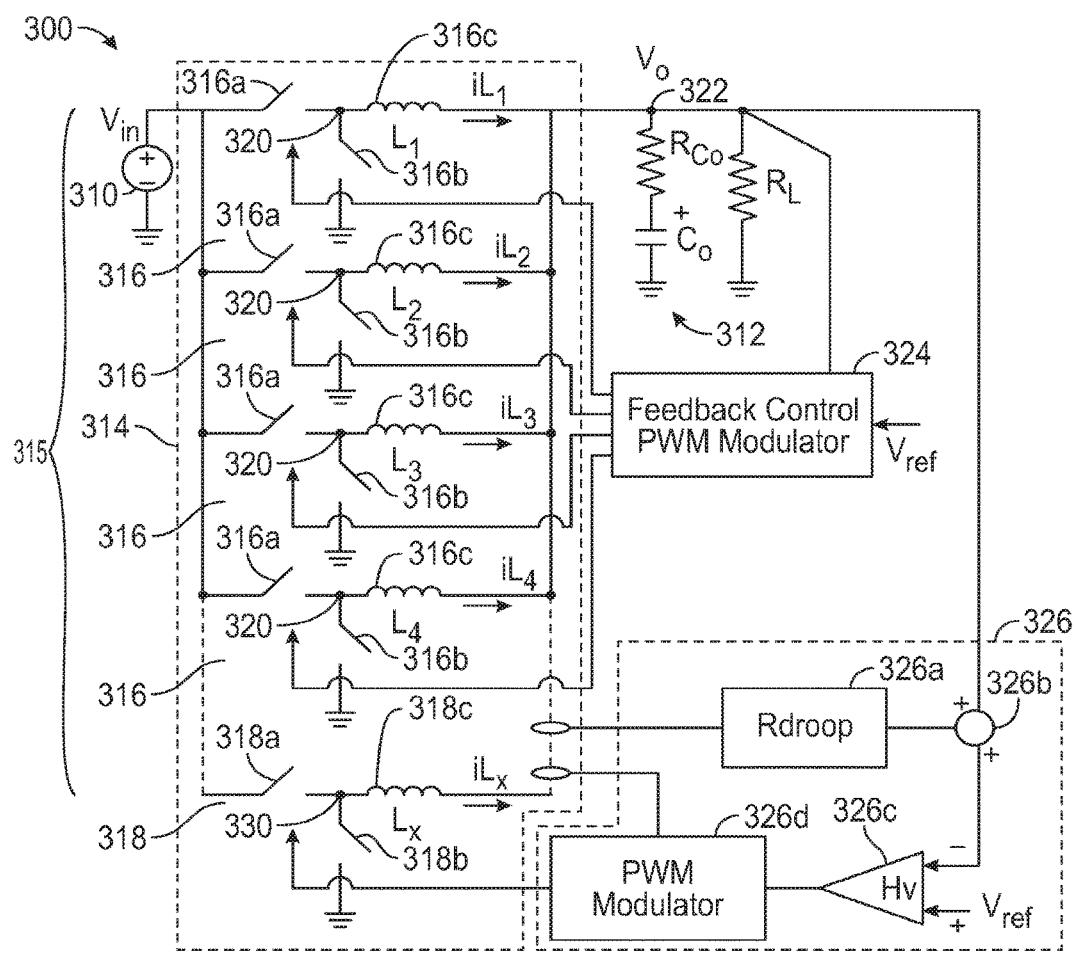
FIG. 3 illustrates an exemplary power supply system with a fast transient response including a main switching converter with a first feedback control mechanism and an auxiliary switching converter with a second and a different feedback control mechanism.

FIG. 3 illustrates an exemplary power supply system 300 with a fast transient response including a main switching converter 315 with a first feedback control mechanism 324 and an auxiliary switching converter 318 with a second and a different feedback control mechanism 326. The power supply system 300 is similar to the power supply system 200 and includes five single phase switching regulators. Only components not described with respect to the system 200 are described hereafter, for brevity.

The power supply system 300 includes two feedback control and PWM modulator mechanisms 324 and 326. The feedback control & PWM modulator 324 is connected at one end to the output terminal 322 and at the other end to the switches 316a and 316b in each of the single phase switching regulators 316. The feedback control & PWM modulator 324 is configured to detect the transient condition and control the switches 316a and 316b to provide a stable Vout as quickly as possible. The feedback control & PWM modulator 324 outputs a transient signal reflecting the amount of the transient current and compares the transient signal with the sensed inductor current signal in each of the regulators 316. If the transient signal (e.g., transient signal ITH) is less than the sensed inductor current signal, the feedback control & PWM modulator 324 sets a new peak inductor current threshold and output a first PWM signal (e.g., a control signal) to meet the new peak inductor current threshold. Similarly, if the transient signal (e.g., transient signal ITH) is more than the sensed inductor current signal, the feedback control & PWM modulator 324 sets a new peak inductor current threshold and output a second PWM signal (e.g., a control signal) to meet the new peak inductor current threshold.

In the scenario in which the sensed inductor current is less than the transient signal ITH, the feedback control & PWM modulator 324 is configured to send a control signal to one or more of the switching regulators 316 to turn ON the first switch 316a and to turn OFF the second switch 316b. The control signal may be a first PWM signal configured to enable the main switching regulator 316 to source additional current to the output with the increased load current. The first PWM signal may be a high signal. The first PWM signal may be directly used to turn the first switch 316a ON and may be inverted to turn the second switch 316b OFF. At the beginning of the clock cycle, the first switch 316a may turn ON and remain ON until the new current threshold due to the transient is reached. The second switch 316b may turn OFF and remain OFF. The first switch 316a may be enabled after the second switch 316b is disabled in a break-before-make fashion. This avoids shoot through where Vin is directly connected to the ground.

During the time the first switch 316a is ON, the low frequency current flows from the power source Vin through the first switch 316a and inductor 316c to the output terminal 322. As a result, the current ramps up in the inductor 316c toward a new current threshold. In this manner, the switching regulator 316 sources low frequency current tracking the transient signal ITH to reach the new current threshold set by the transient. In one implementation, during the transient, the first switch 316a may remain ON and the second switch 316b may remain OFF until the new current threshold set by the transient is reached. To this end, the fixed switching frequency of the switches 316a, 316b may not be maintained during the transient if the on-time for the first switch 316a is longer than the cycle time T, for example.

In one implementation, the feedback control & PWM modulator 324 may activate only one of the regulators 316 to source the necessary current to the output. In another implementation, the feedback control & PWM modulator 324 may activate more than one but less than all of the regulators 316 to source the necessary current to the output. In yet another implementation, the feedback control & PWM modulator 324 may activate all of the regulators 316 to source the necessary current to the output.

When the inductor current exceeds the current threshold or the output voltage exceeds the desired output voltage, the feedback control & PWM modulator 324 is configured to send a control signal to one or more of the switching regulators 316 to turn OFF the first switch 316a and to turn ON the second switch 316b. The control signal may be a low signal configured to enable the main switching regulator 316 to sink current from the output with the decreased load current. In response to the low signal, at the beginning of the clock cycle, the first switch 316a may turn OFF and the second switch 316b may turn ON until the new current threshold set by the transient is reached. The second switch 316b may be enabled after the first switch 316a is disabled in a break-before-make fashion. This avoids shoot through where Vin is directly connected to the ground.

During the on-time of the second switch 316b, the current ramps down in the inductor 316c toward a new current threshold. In this manner, the main switching regulator 316 sinks low frequency current tracking the transient signal to reach the new current threshold. In one implementation, during the transient, the first switch 316a may remain OFF and the second switch 316b may remain ON until the new current threshold set by the transient is reached. To this end, the fixed switching frequency of the switches 316a, 316b may not be maintained during the transient if the on-time for the first switch 316b is longer than the cycle time T, for example.

Once the transient ends (e.g., the new current threshold is reached), the main switching regulator 316 continues to source and/or sink current to maintain the stability of Vout in accordance with its fixed switching frequency and a duty cycle. The duty-cycle may be determined based on the ratio of output voltage to the input voltage and may be set to maintain the fixed frequency of the switches 316a, 316b. The on-time and the off-time of switches 316a, 316b are determined based on the duty-cycle. In one specific example, the duty-cycle may correspond to the duty-cycle set prior to the transient. To this end, the switching regulator 316 is configured to source and/or sink current both during the transient and steady-state operation.

In one implementation, the switching regulators 316 may be peak-current mode regulators. In this type of regulator, first the low-side switch 316b may be turned OFF and then the high-side switch 316a may be turned ON by internal clock or timer, thereby increasing the current of the inductor 316c. In another implementation, the switching regulators 316 may be a valley-current mode regulators. In this type of regulator, first the high-side switch 316a is turned OFF and then the low-side switch 316b is turned ON by internal clock or timer, thereby decreasing the current of the inductor 316c. In yet another implementation, some of the switching regulators 316 may be peak-current mode regulators and some of them may be a valley-current mode regulators. Similarly, the switching regulator 318 may be either a peak-current mode regulator or a valley-current mode regulator.

The feedback control & PWM modulator 326 is connected at one end to the output terminal 322 and at the other end to the switches 318a and 318b in the single phase switching regulator 318. Similar to the feedback control & PWM modulator 324, the feedback control & PWM modulator 326 is configured to detect the transient and control the switches 318a and 318b to provide a stable Vout as quickly as possible. To this end, the feedback control & PWM modulator 326 includes an $R_{droop}$ 326a, an adder 326b, an operational amplifier 326c, and a PWM modulator 326d.

The $R_{droop}$ 326a is configured to prevent low frequency component of the transient signal ITH from entering the auxiliary switching converter 318. The $R_{droop}$ 326a at one end is connected to the inductor 318c and at another end to the adder 326b. Using the $R_{droop}$ 326a, the feedback control & PWM modulator 326 can sense the inductor 318c current $i_{LX}$ and calculate the voltage across $R_{droop}$ 326a ($V_{droop}=i_{LX}*R_{droop}$). The $V_{droop}$ is added to the output voltage Vout using the adder 326b and the output of the adder 326b is input to the inverting terminal of the amplifier 326c. The Vref is input to the noninverting terminal of the amplifier 326c. The amplifier 326c may be either a current-output type transconductance amplifier or voltage-output type amplifier.

The error amplifier 326c monitors the output voltage of the adder 326b, which should be approximately equal to the reference voltage Vref. When these two voltages are not equal or substantially equal, the amplifier 326c provides an error at its output. The error signal may correspond to the higher frequency component of the transient signal ITH. This may be because of the addition of the $R_{droop}$ 326a. The $R_{droop}$ 326a may enable the feedback control & PWM modulator 326 to only absorb the higher frequency component of the transient signal ITH.

The error signal is applied to the PWM modulator 326d along with the sensed inductor 318c current. In one specific example, the PWM modulator 326d includes a comparator. The error signal may be applied to a non-inverting terminal of the comparator and the sensed inductor 318c current may be applied to the inverting terminal of the comparator. Based on the difference between the sensed inductor current and the higher frequency component of the transient signal ITH, the PWM modulator 326d may issue a control signal to enable the auxiliary switching converter 318 to track the higher frequency component of the transient signal ITH.

If there is a sudden increase in the load current, the output voltage decreases. This decrease is sensed by the feedback control & PWM modulator 326 and a corresponding error signal is generated. The error signal corresponds to the higher frequency component of the transient signal ITH. The error signal is received by the PWM modulator 326d along with the sensed high frequency inductor 318c current. The PWM modulator 326d compares the two signal and based on their difference either issues a first control signal or a second control signal.

If the higher frequency component of the transient signal ITH is more than the sensed inductor 318c current signal, the PWM modulator 326d may output the first control signal to the auxiliary switching converter 318. In keeping with the previous example, the first control signal may be a high signal to turn ON the high switch 318a and turn OFF the low switch 318b. This enables the auxiliary switching converter 318 to source additional current to the output terminal 322 with the increased load current. The first control signal may be directly used to control the first switch 318a and may be inverted to control the second switch 318b. In response to the first control signal and at the beginning of the clock cycle, the first switch 318a may turn ON and remain ON until the new current threshold set by the transient is reached. The second switch 318b may remain OFF. The first switch 318a may be enabled after the second switch 318b is disabled in a break-before-make fashion. This avoids shoot through where Vin is directly connected to the ground.

During the time the first switch 318a is ON, the high frequency current flows from the power source Vin through the first switch 318a and inductor 318c to the output terminal 322. As a result, the current ramps up in the inductor 318c toward a new current threshold. In this manner, the auxiliary switching converter 318 sources high frequency current tracking the higher frequency component of the transient signal ITH to reach the new current threshold. The sourced high frequency current may be short lived and may only be present during the transient and not during the steady-state operation. During the steady-state operation, the auxiliary switching converter 318 may source zero current to the load.

If the higher frequency component of the transient signal ITH is less than the sensed high frequency inductor 318c current signal, the PWM modulator 326d may output the second control signal. The second control signal is the low signal configured to turn OFF the first switch 318a and to turn ON the second switch 318b. In response to the second control signal, at the beginning of the clock cycle, the first switch 318a may turn OFF and the second switch 318b may turn ON. The second switch 318b may be enabled after the first switch 318a is disabled in a break-before-make fashion. This avoids shoot through where Vin is directly connected to the ground.

The second switch 318b may remain ON until the new current threshold set by the transient is reached. During the off-time of the first switch 318a and the on-time of the second switch 318b, the current ramps down in the inductor 318c toward a new current threshold. In this manner, the auxiliary switching converter 318 sinks high frequency current tracking the higher frequency component of the transient signal ITH to reach the new current threshold. In one implementation, during the transient, the first switch 318a may remain OFF and the second switch 318b may remain ON until the new current threshold set by the transient is reached. To this end, the fixed switching frequency of the switches 318a, 318b may not be maintained during the transient if the on-time for the switch 318b is longer than the cycle time T, for example.

With the addition of the $R_{droop}$ 326a, the impedance of the channel corresponding to the auxiliary switching converter 318 at higher frequency may be less than the impedance of the channel corresponding to the main switching converter 316. Therefore, during the transients where this is a sudden increase or decrease in the load current, the higher frequency component of the transient signal ITH may be absorbed by the channel switching converter 318. The lower frequency component of the transient signal ITH may be absorbed by the channel corresponding to the main switching converter 316 since this channel has a lower impedance in the lower frequency than the channel corresponding to the auxiliary switching converter 318.

To illustrate further, at a lower frequency the impedance of the channel corresponding to the auxiliary switching converter 318 may correspond to the impedance of $R_{droop}$. At a higher frequency, the impedance of the auxiliary switching converter 318 follows the impedance of capacitor Cout. In contrast, the impedance of the channel corresponding to main switching converter 316 at lower frequency may be below the impendence of the channel corresponding to the auxiliary switching converter 318. At the higher frequency, the impedance of the channel corresponding to main switching converter 316 may be above the impedance of the auxiliary switching converter channel 318. To this end, the auxiliary switching converter channel 318 may absorb the higher frequency component of the transient signal ITH.

In this manner, the auxiliary switching converter 318 may source or sink current only during the transients and in response to the higher frequency component of the transient signal and may not source or sink current at other times. For example, during the steady-state, the sourced current from the auxiliary switching converter 318 may have zero average. Once the higher frequency component of the transient signal fades away, the auxiliary switching converter 318 may not source additional current to the output to maintain high efficiency for the power supply system 300. That is, the auxiliary switching converter 318 may only be responsive to the transients and may generate current waveforms that only track the higher frequency component of the transient signal ITH. As noted above, the transients may correspond to the beginning portion and the ending portion of the current load step associated with edges of the current load step.

The main switching converter 316 may operate both during the transients and outside of the transients during steady-state operation. During the transients, the main switching converter 316 may be responsive to both the higher frequency component and lower frequency component of the transient signal ITH. Alternatively, the main switching converter 316 may be responsive only to the lower frequency component of the transient signal ITH and not to the higher frequency component of the transient signal ITH. In one specific example, the feedback control and PWM modulator 324 corresponding to the main switching converter 316 may include a low pass filter for passing through only the lower frequency component of the transient signal ITH to enable the converter 316 to only generate low frequency current waveforms. In another implementation, the feedback control and PWM modulator 324 may be configured to provide transient signal ITH in which the higher frequency component is attenuated and thereby does not significantly reduce the efficiency of the main switching converter 316.

Figure 4:
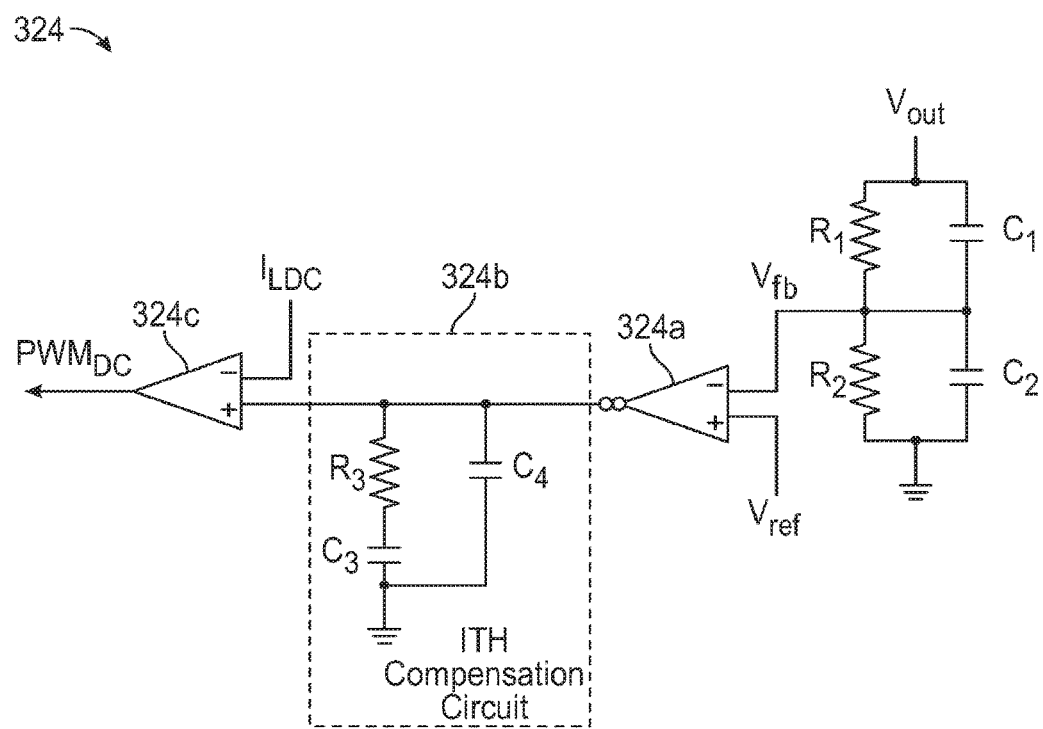
FIG. 4 illustrates in more detail the first feedback control mechanism shown in FIG. 3.

FIG. 4 illustrates in more detail the exemplary feedback control & PWM modulator 324 shown in FIG. 3. The feedback control & PWM modulator 324 is configured to provide a pulse-width-modulation method to control the transient and steady-state output of the main switching converter 316 shown in FIG. 3. In one specific example, this is done by changing the duty-cycle of the main switching converter 316. Other control methods may also be used instead or in addition to the pulse-width-modulation method.

This PWM method senses the output voltage and compares it with a reference voltage to establish a small error signal. This error signal is then compared with another reference signal. The reference signal may be a ramping signal. The comparator compares the two signals and issues a pulse width signal for operating the main switching converter 316. If the output voltage changes, the error signal also changes and so does the output pulse width. Therefore, depending on the increase or decrease of the output, the duty-cycle of the output pulse width either increase or decrease to move the output voltage and reduce the error signal to zero.

The feedback control & PWM modulator 324 is connected at one end to the output terminal 322 and at the other end to the switches 316a and 316b for driving the switches 316a and 316b. The feedback control & PWM modulator 324 is configured to detect transients and control the switches 316a and 316b to provide a stable Vout as quickly as possible. To this end, the feedback control & PWM modulator 324 includes resistors R1 and R2, capacitors C1, C2, amplifier 324a, and a frequency compensation circuit 620b.

The Vout is sensed through a network including R1, R2, C1, and C2. R1 and R2 form a resistor divider and scale the signal Vout to make it proportional to Vref. Capacitors C1 and C2 are provided to make the divider frequency dependent. This frequency dependent divided Vout may be referred to as feedback voltage Vfb. The feedback voltage Vfb and a reference voltage Vref are input to the error amplifier gm (shown as a trans-conductance (gm) amplifier) 324a. The error amplifier 324a may be either a current-output type transconductance amplifier or voltage-output type amplifier.

The error amplifier 324a monitors the feedback voltage Vfb that is proportional to Vout at its inverting input. The feedback voltage Vfb should be approximately equal to the reference voltage Vref. When these two voltages are not equal, the amplifier 324a provides a transient signal ITH (a small error signal) at its output. The transient signal ITH of the amplifier 324a may correspondence to the difference between the actual output voltage and the desired output voltage. The transient signal ITH of the amplifier 324a is fed to a compensation network 324b. The compensation network 324b includes a resistor R3 and capacitors C3 and C4. The resistor R3 and the capacitor C3 are connected in series and at one end to the output terminal of the amplifier 324a and at another end to the ground. The resistor R3 and capacitor C3 are connected in parallel with the capacitor C4.

The compensated transient signal is input to the non-inverting terminal of the PWM 324c. The inverting terminal of the PWM 324c receives the sensed inductor current signal from the regulator 316. The sensed inductor current may be identified via a resistor connected in series with the inductor 316c. Based on the difference between the sensed inductor current and the compensated transient signal ITH, the comparator issues a control signal to the regulator 316 to track the transient condition.

In the scenario in which the sensed inductor current is less than the transient signal ITH, the PWM 324c is configured to send a control signal to the regulator 316 to turn ON the first switch 316a and to turn OFF the second switch 316b. The control signal may be a first pulse-width signal configured to enable the main switching regulator 316 to source additional current to the output with the increased load current. The first PWM signal may be a high signal. At the beginning of the clock cycle, the first switch 316a may turn ON and remain ON until the new current threshold due to the transient is reached. During the time the first switch 316a is ON, the low frequency current flows from the power source Vin through the first switch 316a and inductor 316c to the output terminal 322. As a result, the current ramps up in the inductor 316c toward a new current threshold. In this manner, the main switching regulator 316 sources low frequency current tracking the transient signal ITH to reach the new current threshold set by the transient.

When the inductor current exceeds the current threshold or the output voltage exceeds the desired output voltage, the PWM 324c is configured to send a control signal to the regulator 316 to turn OFF the first switch 316a and to turn ON the second switch 316b. The control signal may be a low signal configured to enable the main switching regulator 316 to sink current from the output with the decreased load current. In response to the low signal, at the beginning of the clock cycle, the first switch 316a may turn OFF and the second switch 316b may turn ON until the new current threshold set by the transient is reached. During the on-time of the second switch 316b, the current ramps down in the inductor 316c toward a new current threshold. In this manner, the main switching regulator 316 sinks low frequency current tracking the transient signal to reach the new current threshold set by the transient.

Once the transient ends (e.g., the new current threshold is reached), the main switching regulator 316 continues to source and/or sink current to maintain the stability of Vout in accordance with its fixed switching frequency and a duty cycle. The duty-cycle may be determined based on the ratio of output voltage to the input voltage and may be set to maintain the fixed frequency of the switches 316a, 316b. The on-time and the off-time of switches 316a, 316b are determined based on the duty-cycle. In one specific example, the duty-cycle may correspond to the duty-cycle set prior to the transient. To this end, the main switching regulator 316 is configured to source and/or sink current both during the transient and steady-state operation.

As noted above, the feedback control & PWM modulator 324 may be modified to include a low pass filter. The low pass filter may be placed between the compensation circuit and the PWM 324c and may be configured to allow only the lower frequency component of the transient signal ITH in the main switching converter 315.

Figure 5:
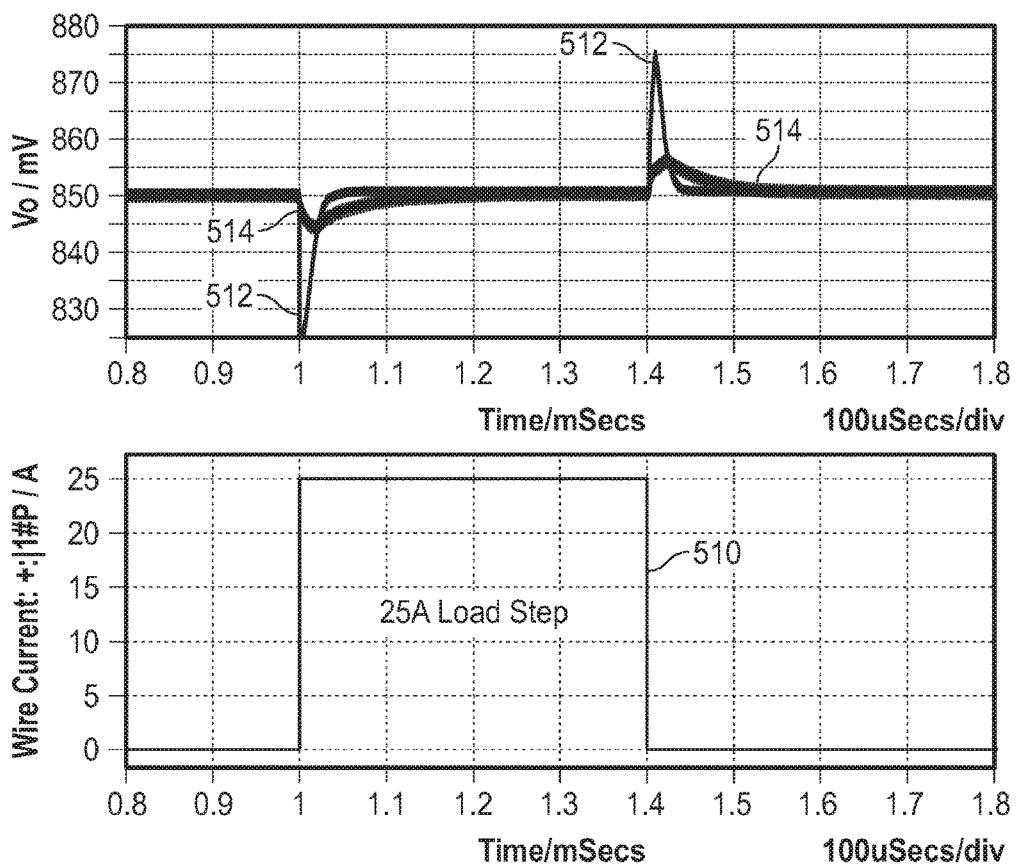
FIG. 5 compares the output voltage ripple of the power supply system shown in FIG. 1 with output voltage ripple of the power supply system shown in FIG. 3 for a load step of 25A.

FIG. 5 compares the output voltage ripple of the power supply system 100 shown in FIG. 1 with output voltage ripple of the power supply system 300 shown in FIG. 3 for a load step of 25A. As shown, the output voltage ripple 512 of the power supply system 100 in response to the load step of 25A is significantly larger than the output voltage ripple 514 in response to the same load step. In one example, the ripple may be about 70% less in the system 300 than the ripple in the system 100. In another example, the ripple may be about 50% less in the system 300 than the ripple in the system 100. This is accomplished without a need for a complicated control method or employing an additional AC capacitor to the output between the output terminal and the control loop for the auxiliary switching converter. The AC capacitor is configured to prevent DC or low frequency current from entering the control loop for auxiliary switching converter. The AC capacitor can add to the cost and size of the power supply system. Instead, the power supply system of the instant application as described with respect to FIG. 3 prevents the DC or low frequency current from entering the auxiliary switching converter via a network including an $R_{droop}$ resistor, an adder, and an operational amplifier.

Figure 6:
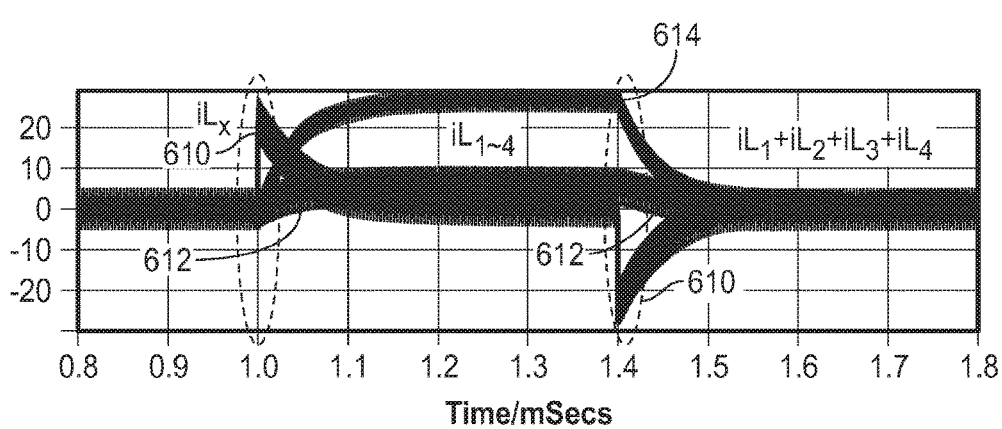
FIG. 6 illustrates exemplary current waveforms generated by the power supply system shown in FIG. 3 in response to the 25A load step.

FIG. 6 illustrates exemplary current waveforms generated by the power supply system 300 shown in FIG. 3 in response to the 25A load step. The current waveform 610 shows the current through inductor 318c during transient. The current waveform 612 shows the current through the inductor 316c in each of the main switching regulators 316. The current waveform 614 show the cumulative current flowing through the inductors $L_1$-$L_4$.

As shown, during the transient when the load suddenly draws more current than previously, the current 610 through inductor 318c quickly ramps up while the current 612 through the inductors 316c of the main switching converter 316 slowly ramp up to respond to the transient. The current 610 through the inductor 318c returns to zero after the transients due to the active droop control method of the instant application. Specifically, because of the active droop control method of the instant application, the current 610 is configured to track the higher frequency component of the transient signal ITH and therefore returns to zero as soon as the transient ends and the output current reaches a steady-state (in this case the higher state of 25A). In contrast, the current 612 does not track the higher frequency component of the transient signal ITH and slowly rises in response to the new current threshold set by the transient. Once the transient ends, the main switching converter continues to source or sink current to maintain the steady-state condition at the load. For example, once the steady-state condition is reached, the duty-cycle of the main switching converter may return to the original duty-cycle prior to the sudden increase or decrease in the load current.

During the transient when the load draws less current than previously, the current 610 through the inductor 318c quickly ramps down while the current 612 through the inductors 316c of the main switching converter 316 slowly ramps down to respond to the transient. The current 610 through inductor 318c returns to zero shortly after the end of the transient due to the AVP method. As a result, the cumulative currents through the inductors L1-L4 and Lx result in a fast and efficient transient response without a need for an additional output capacitor to prevent low frequency current from entering the auxiliary switching converter.

Figure 7:
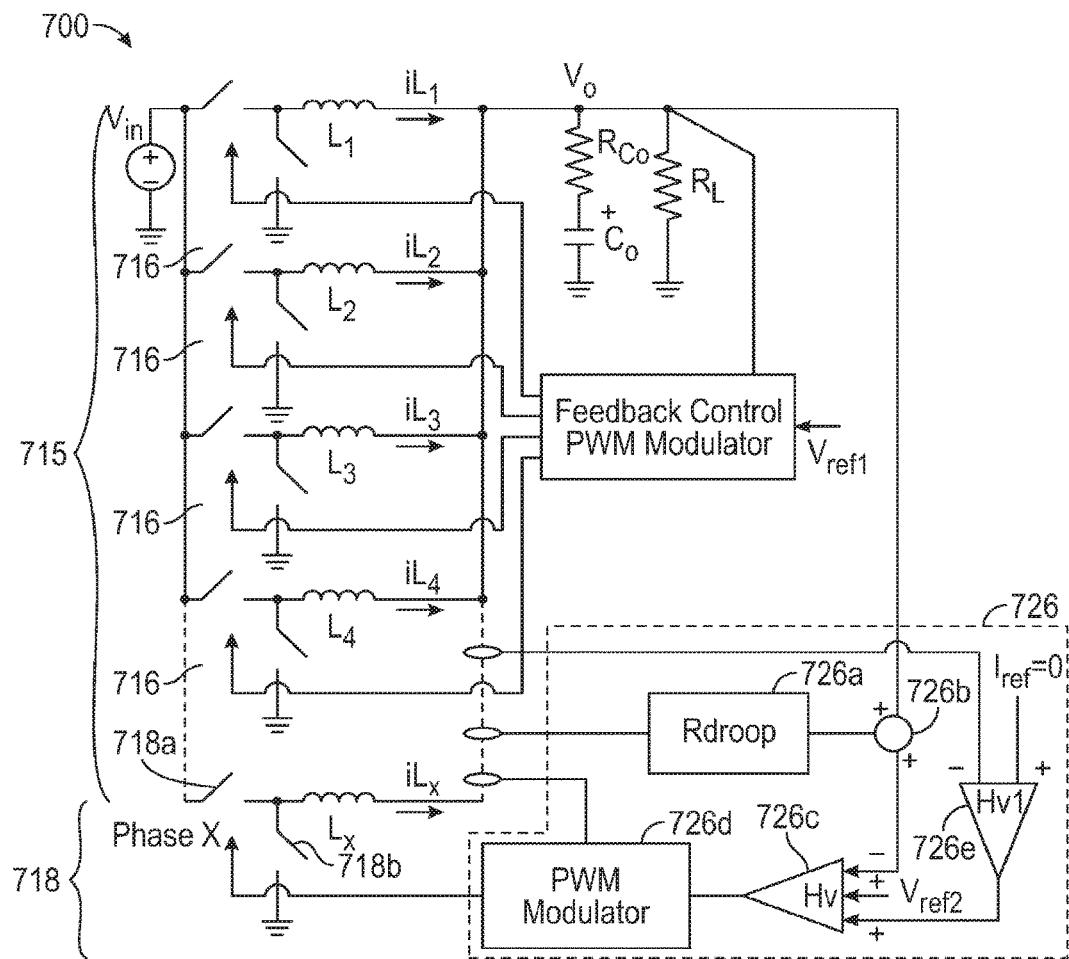
FIG. 7 illustrates another exemplary power supply system with a fast transient response including a main switching converter with a first feedback control mechanism and an auxiliary switching converter with a second and a different feedback control mechanism.

FIG. 7 illustrates another exemplary power supply system 700 with a fast transient response including a main switching converter 715 with a first feedback control mechanism and an auxiliary switching converter 718 with a second and a different feedback control mechanism. The first feedback control mechanism includes a first reference voltage and the second feedback control mechanism includes a second reference voltage. The second reference voltage may be different from the first reference voltage; otherwise, the first feedback control mechanism may be the same as the feedback control mechanism 324 shown in FIG. 3 and described in more details in FIG. 4. The second feedback control mechanism may be the same as the feedback control mechanism 326 shown in FIG. 3. That is, the control loop for slower switching requestors 716 may have a first reference voltage and the control loop for the faster auxiliary switching regulator 718 may have a second reference voltage. In this implementation, voltage feedback gain could be different due to component variation. These factors may result in non-zero low frequency current (DC current) in the auxiliary switching converter 718. Therefore, as shown, an additional servo loop can may be added to reduce or eliminate the low frequency current in the auxiliary switching converter 718.

To this end, the second feedback control mechanism 726 includes an $R_{droop}$ 726a, an adder 726b, an operational amplifier 726c, a PWM modulator 726d, and an operational amplifier 726e. The $R_{droop}$ 726a is configured to prevent low frequency component of the transient signal ITH from entering the auxiliary switching converter 718. The $R_{droop}$ 726a at one end is connected to the inductor $L_x$ (or to the output terminal) and at another end to the adder 726b. Using the $R_{droop}$ 726a, the second feedback control mechanism 726 can sense the inductor current $i_{LX}$ and calculate the voltage across $R_{droop}$ 726a ($V_{droop}=i_{LX}*R_{droop}$). The $V_{droop}$ is added to the output voltage Vout using the adder 726b and the output of the adder 726b is input to the inverting terminal of the amplifier 726c. The second reference voltage Vref2 is input to the non-inverting terminal of the amplifier 726c. The amplifier 726c may be either a current-output type transconductance amplifier or voltage-output type amplifier.

The amplifier 726c is also configured to receive at its non-inverting input the output of the amplifier 726e. The amplifier 726e is configured to receive at its inverting input the average high frequency inductor Lx current and at its non-inverting input a reference current. The reference current may be zero average low frequency current. The amplifier 726e generates a first error signal when the average high frequency inductor Lx current is not substantially equal to the zero average reference current. The first error signal is provided to the error amplifier 726c The amplifier 726c uses output of the adder 726b, the second reference voltage Vref2 and the first error signal to generate a second error signal. Specifically, the amplifier 726c may add the first error signal to the second reference voltage and subtract the resulting signal from the output of the adder circuit 726b to output the second error signal. The second error signal may correspond to the higher frequency component of the transient signal ITH.

The higher frequency component of the transient signal ITH is applied to the PWM modulator 726d along with the sensed inductor Lx current. In one specific example, the PWM modulator 726d includes a comparator. The higher frequency component of the transient signal ITH may be applied to a non-inverting terminal of the comparator and the sensed inductor Lx current may applied to the inverting terminal of the comparator. Based on the difference between the sensed inductor 718c current and the higher frequency component of the transient signal ITH, the PWM modulator 726d may issue a pulse width signal to track the higher frequency component of the transient signal. The pulse width signal may either be a high signal or a low signal. The high signal turns ON the first switch 718a and turns OFF the second switch 718b. The low signal turns OFF the first switch 718a and turns ON the second switch 718b.

If the higher frequency component of the transient signal ITH is more than the sensed high frequency inductor 718c current signal, the PWM modulator 726d issues the high signal to the auxiliary switching converter 718 to turn ON the first switch 718a and turn OFF the second switch 718b. When the first switch 718a turns ON, the high frequency current flows from the power source Vin through the first switch 718a to the inductor 718c, thereby increasing the inductor 718c current. The high frequency current tracks the higher frequency component of the transient signal ITH and is only present during the transient.

If the higher frequency component of the transient signal ITH is less than the sensed high frequency inductor 718c current signal, the PWM modulator 726d may output the low signal to the auxiliary switching converter 718 to turn OFF the first switch 718a and turn ON the second switch 718b. When the first switch 718a turns OFF and the second switch 718b turns ON, the high frequency current flows from the output terminal through the inductor 718c and the second 718b to the ground, thereby increasing the inductor 718c current. The high frequency current tracks the higher frequency component of the transient signal and is only present during the transient.

As noted above, there is a zero DC current in the auxiliary switching converter 718. Therefore, the auxiliary switching converter 718 may only be used to deal with the transients to sink or source additional current with sudden increase or decrease in the load current (e.g., at the beginning and ending of the load step). To this end, once the higher frequency component of the transient signal ITH fades away, the auxiliary switching converter 718 may not sink or source additional current to the output terminal. The average current provided to the output terminal in this scenario may be zero. That is, the auxiliary switching converter 718 may only be responsive to the beginning portion and the ending portion of the transient associated with edges of the current load step.

In one specific example, Vin may be 8V, Vout may be 1V, the current load step may be 25 A, the switching frequency of the main switching converter may be 280 kHz, the switching frequency of the auxiliary switching converter may be 2.25 MHz, the Rdroop may be 5 mΩ, the inductance of the inductor in the main switching converter may be 6.8 µH, the inductance of the inductor in the auxiliary switching converter may be 100 nH, and Cout may be 100 µF. In another specific example, Vin may be 8V, Vout may be 1V, the current load step may be 25 A, the switching frequency of the main switching converter may be 280 kHz, the switching frequency of the auxiliary switching converter may be 2.25 MHz, the Rdroop may be 5 mΩ, the inductance of the inductor in the main switching converter may be 6.8 µH, the inductance of the inductor in the auxiliary switching converter may be 680 nH, and Cout may be 100 µF.

In one implementation, the main switching converter and the auxiliary switching converter along with their respective control mechanisms can be provided in two separate integrated circuits. In another implementation, the main switching converter and the auxiliary switching converter along with their respective control mechanism may be provided in a single integrated circuit. In another implementation, the main switching converter and the auxiliary switching converter may be provided in a single integrated circuit and their control mechanisms may be provided in a separate integrated circuit. In yet another implementation, the switches for both the main switching converter and the auxiliary switching converter and the control mechanism for the switches may be provided on a single integrated circuit and the inductors may be located outside the single integrated circuit. In yet another implementation, the switches for both the main switching converter and the auxiliary switching converter may be provided on a single integrated circuit and the control mechanism and the inductors may be located outside the single integrated circuit.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A power interface device comprising:
   a output sense terminal configured to sense a shared converter output voltage of a main switching converter and an auxiliary switching converter at an output terminal;
   an auxiliary current sense terminal configured to sense an auxiliary current of an auxiliary switching converter; and
   an auxiliary control loop circuit configured to detect a transient signal at the output terminal and, responsive to the transient signal, issue an auxiliary control signal for controlling the auxiliary switching converter based on the shared converter output voltage and the sensed auxiliary current,
   wherein the auxiliary switching converter is configured to operate at an auxiliary switching frequency different from a main switching frequency of the main switching converter.

2. The power interface device of claim I., wherein the auxiliary control loop circuit comprises:
   an adder circuit configured to receive the shared converter output voltage from the output terminal and to receive a voltage representative of the sensed auxiliary current, and to generate an adder output voltage; and
   a resistive element coupled between the auxiliary switching converter and the adder circuit, wherein the adder output voltage is received by the adder circuit from the resistive element.

3. The power interface device of claim 2, wherein:
   the main switching converter includes a first main switch, a second main switch, and a main inductor,
   the first main switch at one end is coupled to an input terminal of the main switching converter and at another end is coupled to a main node,
   the second main switch at one end is coupled to the main node and at another end is coupled to a ground terminal, and
   the main inductor at one end is coupled to the main ode and at another end is coupled to the output terminal.

4. The power interface device of claim 2, wherein the auxiliary switching converter is coupled in parallel with the main switching converter.

5. The power interface device of claim 2, wherein:
   the auxiliary switching converter includes a first auxiliary switch, a second auxiliary switch, and an auxiliary inductor,
   the first auxiliary switch at one end is coupled to an input terminal of the auxiliary switching converter and at another end is coupled to an auxiliary node,
   the second auxiliary switch at one end is coupled to the auxiliary node and at another end is coupled to a ground terminal, and
   the auxiliary inductor at one end is coupled to the auxiliary node and at another end is coupled to the output terminal.

6. The power interface device of claim 2, wherein the auxiliary control loop circuit is configured to prevent a lower frequency component of a transient signal associated with the transient signal from entering the auxiliary switching converter from the output terminal.

7. The power interface device of claim 2, wherein:
   the main switching converter includes a plurality of single phase switching regulators coupled in parallel with each other between an input terminal of the main switching converter and the output terminal, and
   each of the single phase switching regulators is configured to operate at the main switching frequency which is lower than the auxiliary switching frequency to provide a stable output at the output terminal.

8. The power interface device of claim 2, wherein the auxiliary control loop circuit further includes:
   a first auxiliary error amplifier configured to receive an output of the adder circuit and a reference voltage, and output a first error signal when the output of the adder circuit and the reference voltage are not substantially equal to each other, and
   an auxiliary pulse-width modulator configured to receive the first error signal and sensed high frequency inductor current from the auxiliary switching converter and issue the auxiliary control signal based on a difference between the first error signal and the sensed high frequency inductor current.

9. The power interface device of claim 8, wherein:
the first error signal corresponds to a higher frequency component of the transient signal,
the resistive element enables the auxiliary control loop circuit to pass the higher frequency component of the transient signal and not a lower frequency component of the transient signal to the auxiliary switching converter, and
the higher frequency component of the transient signal is only present when there is a sudden increase or decrease in a load current.

10. The power interface device of claim 8, wherein:
in response to the auxiliary control signal, the auxiliary switching converter is configured to source the auxiliary current to the output terminal, and
the auxiliary current is configured to track a higher frequency component of the transient signal.

11. The power interface device of claim 8, wherein:
in response to the auxiliary control signal, the auxiliary switching converter is configured to sink the auxiliary current from the output terminal, and
the auxiliary current is configured to track a higher frequency component of the transient signal.

12. The power interface device of claim 8, wherein:
the auxiliary control loop circuit further includes a second auxiliary error amplifier configured to receive the sensed auxiliary current and a zero average low frequency current and output a second error signal, and
the first auxiliary error amplifier is configured to output a higher frequency component of the transient signal based on the output of the adder circuit, the reference voltage, and the second error signal.

13. The power interface device of claim 1, further comprising a main control loop circuit at one end coupled to the output terminal and at another end coupled to the main switching converter, the main control loop circuit being configured to detect the transient signal at the output terminal and, responsive to the transient signal, issue a main control signal for driving the main switching converter, wherein the main control loop circuit includes:
a main feedback sense circuit configured to sense an output voltage at the output terminal and produce a feedback voltage,
a main error operational amplifier configured to receive the feedback voltage and a reference voltage and generate the transient signal when the feedback voltage and the reference voltage are not substantially equal to each other, and
a main pulse-width modulator configured to receive the transient signal and sensed low frequency inductor current from the main switching converter and issue the main control signal based on a difference between the transient signal and the sensed low frequency inductor current.

14. The power interface device of claim 13, wherein the main control signal includes a pulse-with-modulation signal for enabling the main switching converter to source low frequency current to track the transient signal and drive an output current to meet an increased load current at a load device.

15. The power interface device of claim 13, wherein:
the main feedback sense circuit includes a plurality of resistors and capacitors configured to sense the output voltage and produce the feedback voltage, and
the main error operational amplifier is configured to receive the feedback voltage at its inverting terminal and to receive the reference voltage at its non-inverting terminal.

16. A power supply system to provide power from a power source to a load device, the power supply system comprising:
an auxiliary switching converter configured to operate with, and at an auxiliary switching frequency different that a main switching frequency of, a main switching converter for sourcing power to the load device; and
an auxiliary control loop circuit configured to detect a transient signal at the load device and, responsive to the transient signal, issue an auxiliary control signal for controlling the auxiliary switching converter based on a converter output voltage associated with the power sourced to the load device and a sensed current provided by the auxiliary switching converter.

17. The power supply system of claim 16, wherein the auxiliary control loop circuit comprises:
an adder circuit configured to receive a converter output voltage provided to the load device and to receive a voltage representative of the sensed auxiliary current, and to generate a feedback voltage; and
a resistive element coupled between the auxiliary switching converter and the adder circuit, wherein the feedback voltage is received by the adder circuit from the resistive element.

18. The power supply system of claim 17, wherein:
the auxiliary switching converter includes a first auxiliary switch, a second auxiliary switch, and an auxiliary inductor, and
the first auxiliary switch at one end is coupled to the power source and at another end is coupled to an auxiliary node, the second auxiliary switch at one end is coupled to the auxiliary node and another end is coupled to a ground terminal, and the auxiliary inductor at one end is coupled to the auxiliary node and at another end is coupled to the load device.

19. The power supply system of claim 17, wherein:
the auxiliary control loop circuit further includes a first auxiliary error amplifier and an auxiliary pulse-width modulator,
the first auxiliary error amplifier is configured to receive the feedback voltage and a reference voltage and output a higher frequency component of the transient signal when the feedback voltage and the reference voltage are not substantially equal to each other, and
the auxiliary pulse-width modulator is configured to receive the higher frequency component of the transient signal and sensed high frequency inductor current from the auxiliary switching converter and issue the auxiliary control signal based on a difference between the higher frequency component of the transient signal and the sensed high frequency inductor current.

20. The power supply system of claim 19, wherein:
the auxiliary control loop circuit further includes a second auxiliary amplifier configured to receive a sensed average high frequency inductor current and a substantially zero average current and output an error signal, and
the first auxiliary error amplifier is configured to output the higher frequency component of the transient signal based on the reference voltage, the feedback voltage, and the error signal from the second auxiliary amplifier.

21. A method for responding to a transient condition, comprising:

receiving a transient signal resulting from a power variation in a shared output power produced by a first switching regulator and a second switching regulator, the transient signal comprising a first frequency corresponding to a portion of the shared output power provided by the first switching regulator and a second frequency corresponding to a portion of the shared output power provided by the second switching regulator;

generating a high frequency component signal based on a comparison of a reference voltage with a high frequency feedback voltage based on a first voltage representative of a output current provided by the second switching regulator with a second voltage representative of the shared output power; and controlling the second switching regulator of the plurality of switching regulators to source current to, or sink current from, the shared output power based on the high frequency feedback voltage and until the shared output power reaches a threshold.

22. The method of claim 21, further comprising: comparing a second voltage representative of the output current provided by the second switching regulator with the high frequency feedback voltage; and if the high frequency feedback voltage is greater than the second voltage, output a first control signal to the auxiliary switching converter to cause the auxiliary switching converter to source additional current to the shared output power, and if the high frequency feedback voltage is less than the second voltage, output a second control signal to the auxiliary switching converter to cause the auxiliary switching converter to sink current from the shared output power to a ground.

* * * * *